April 27, 1926. 1,582,413
B. McCLELLAND
DAMPER ACTUATING MECHANISM FOR FURNACES
Filed June 26, 1922 6 Sheets-Sheet 1
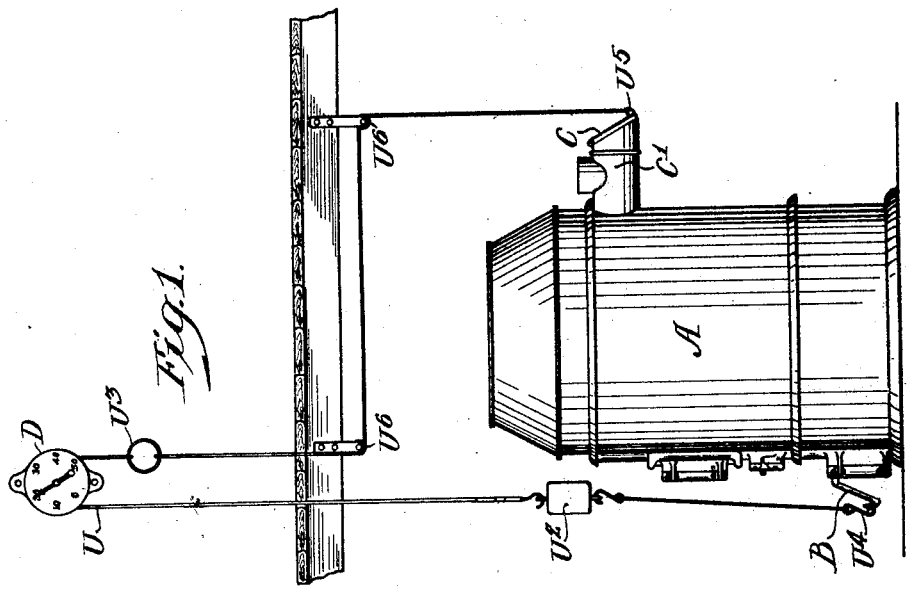
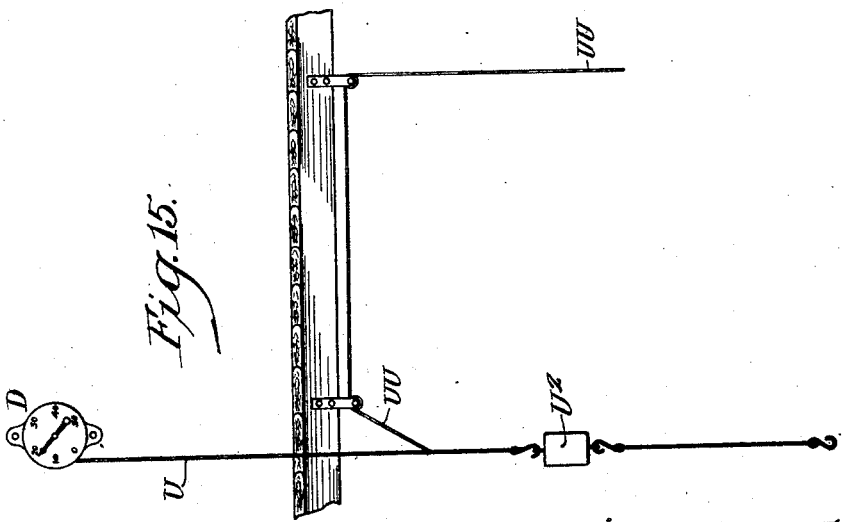
Inventor
Bert McClelland.
by Jennie Chambers
his Attorney.

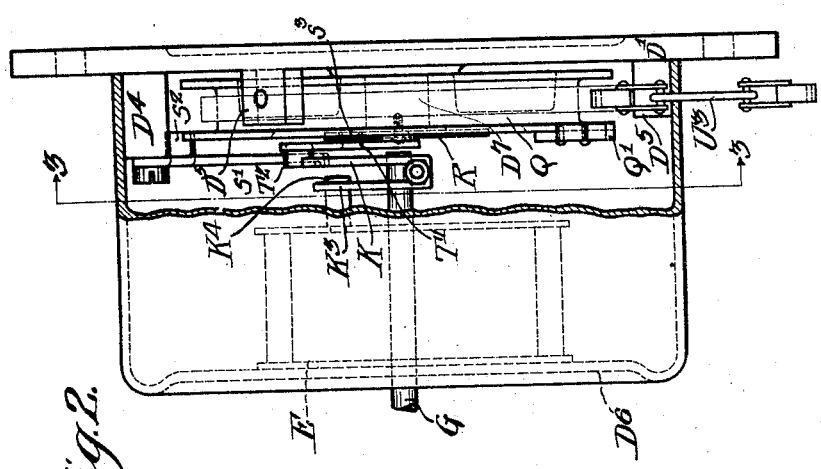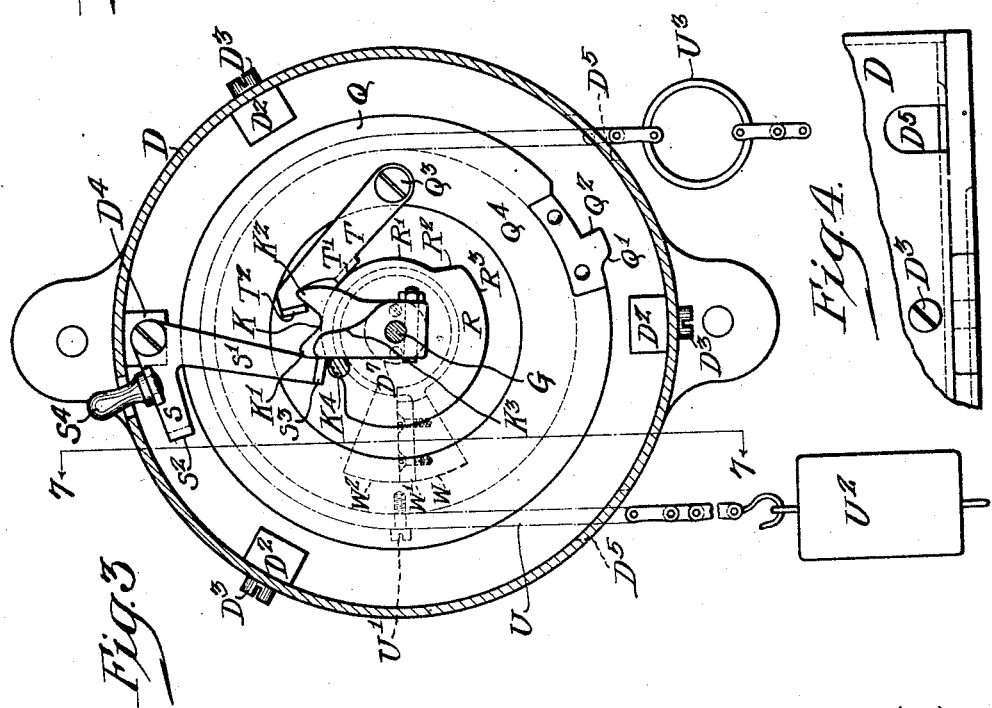

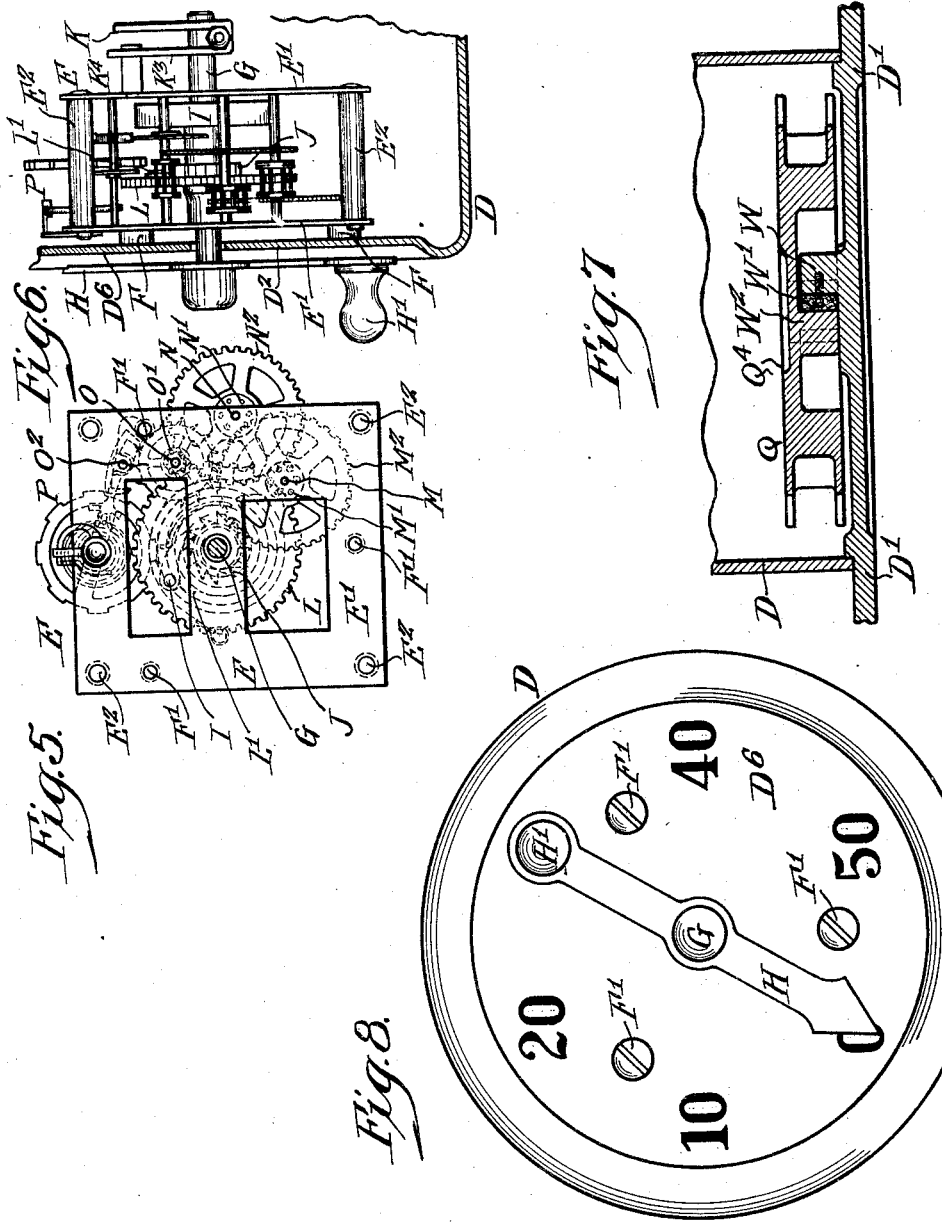

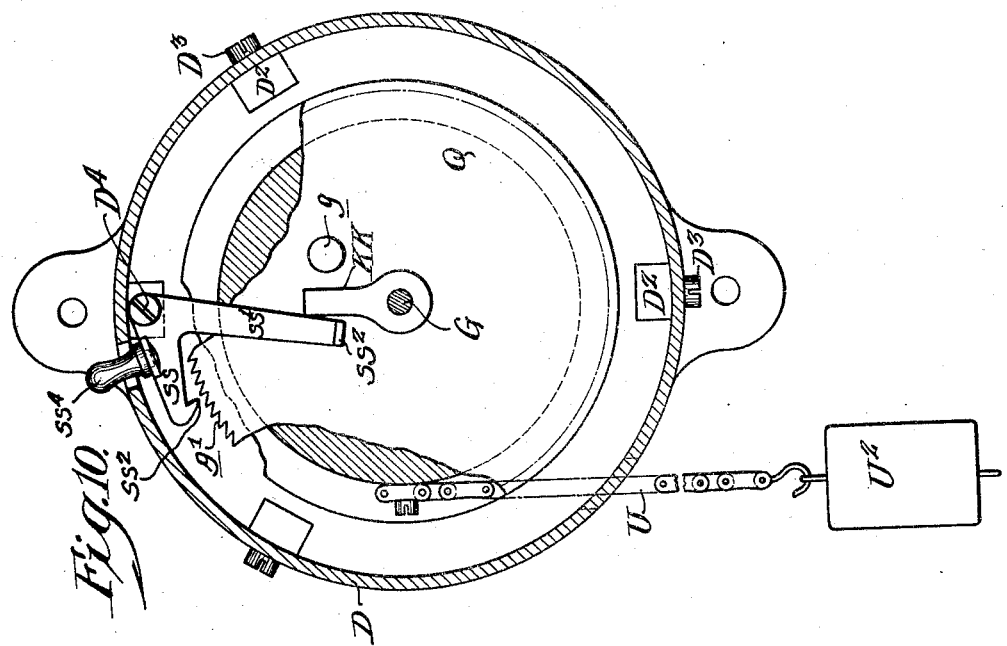
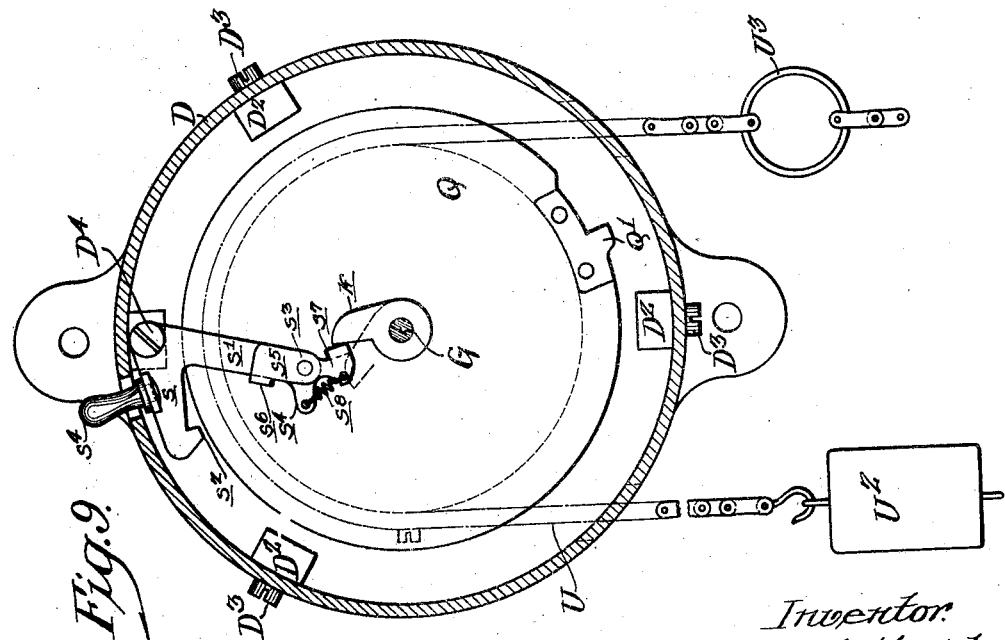

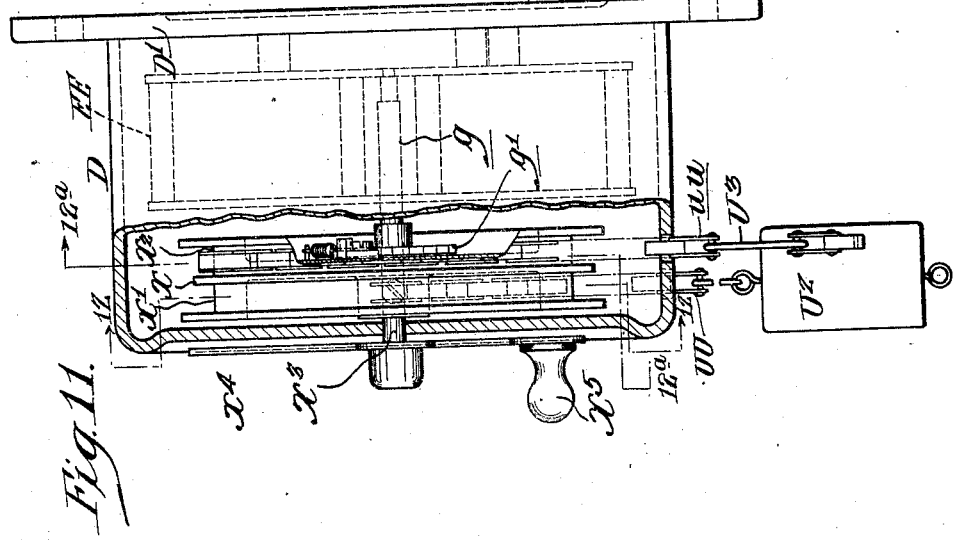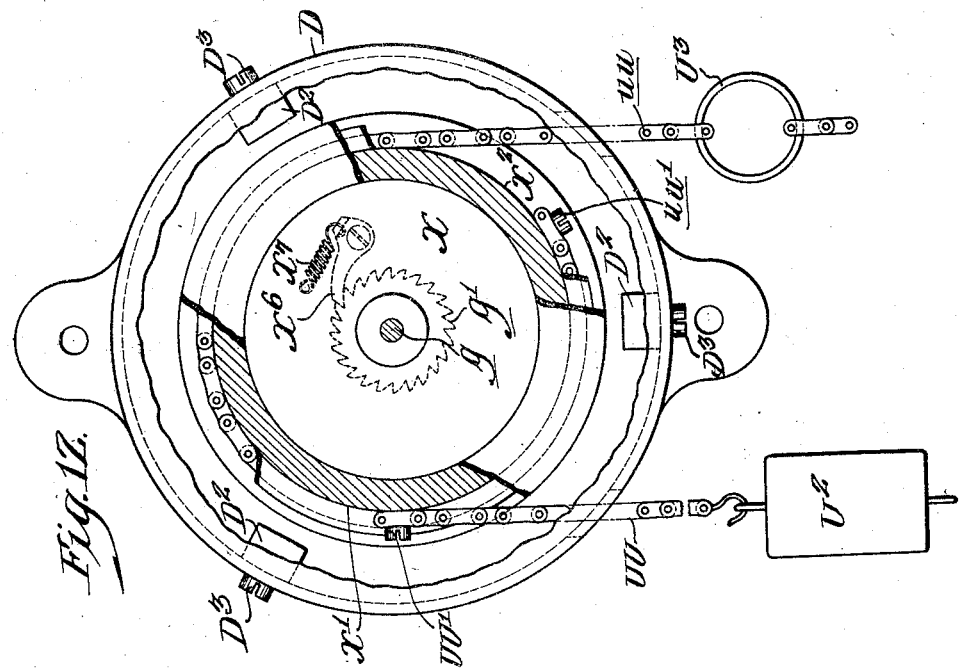

April 27, 1926.

B. McCLELLAND 1,582,413

DAMPER ACTUATING MECHANISM FOR FURNACES

Filed June 26, 1922          6 Sheets-Sheet 6

Inventor.
Bert McClelland.

Patented Apr. 27, 1926.

1,582,413

UNITED STATES PATENT OFFICE.

BERT McCLELLAND, OF SELLERSVILLE, PENNSYLVANIA.

DAMPER-ACTUATING MECHANISM FOR FURNACES.

Application filed June 26, 1922. Serial No. 570,818.

*To all whom it may concern:*

Be it known that I, BERT McCLELLAND, a citizen of the United States of America, and resident of Sellersville, county of Bucks, State of Pennsylvania, have invented certain new and useful Improvements in Damper-Actuating Mechanism for Furnaces, of which the following is a true and exact description, reference being had to the accompanying drawings, which form a part thereof.

My invention relates to mechanism for operating the dampers of furnaces and has for its object to provide simple and efficient mechanism whereby the dampers can be set to promote combustion in the furnace and automatically shifted to a position in which they will restrict combustion in a predetermined time limit.

The nature of my invention will be best understood as described in connection with the drawings in which it is illustrated, and in which—

Figure 1 is a view showing the furnace and its dampers and a convenient way of connecting the dampers to the actuating mechanism.

Figure 2 is a side elevation of the casing opening, the damper actuating mechanism partly broken away to show a portion of its contained mechanism.

Figure 3 is a vertical section taken on the line 3—3 of Fig. 2.

Figure 14:
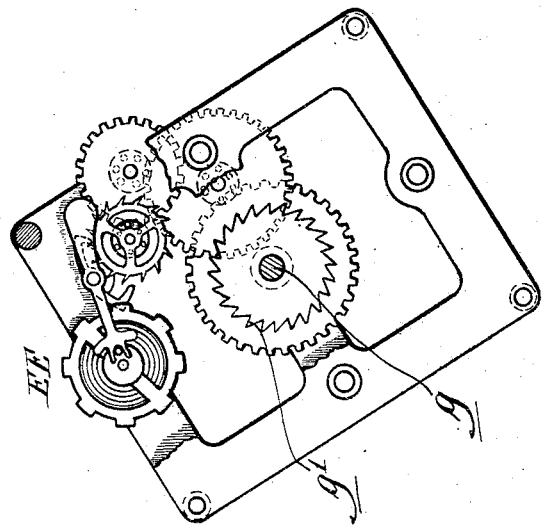

Figure 4, a fragmental view of a portion of the casing looking upward from bottom of Fig. 3.

Figure 5 is an elevation of the time escapement device forming part of the damper actuating mechanism.

Figure 6 is a sectional view taken along the center line of the casing and dial and showing the time escapement device not sectioned but in elevation.

Figure 7 is a sectional view on the line 7—7 of Fig. 3.

Figure 8 is a front view of the dial and pointer.

Figure 9 is an elevation showing a modification of the mechanism shown in the above figures of the drawing.

Figure 10, an elevation showing another modification.

Figure 11 is a side elevation of a casing partly broken away and the mechanism of still another modified form of my device.

Figure 12 is a front view of the mechanism shown in Fig. 11, with the front of the casing broken away and the double sheave shown partly in section on the line 12, and partly in section on the line 12$^a$.

Figure 13:
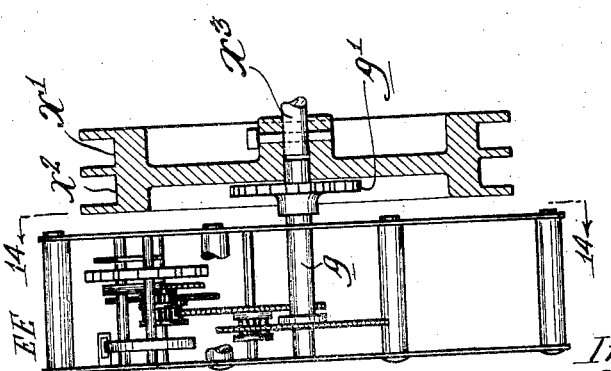

Figure 13 is a side elevation of the time escapement and sheave of Figs. 11 and 12, and Figure 14 is a face view of the time escapement taken as on the line 14—14 of Fig. 13.

Figure 15 is a view showing a modification of the connections for actuating the dampers, adapted for use with such a modification of my invention as is shown in Fig. 1.

A indicates the furnace. B, the damper controlling the admission of air to the bottom of the furnace. C, a damper controlling the admission of air to the flue C'. D is a casing enclosing the damper actuating mechanism, this casing being secured to a plate D' adapted to be secured to a wall. The casing D is secured to studs D$^2$ projecting from the plate D' by means of screws, as indicated at D$^3$. D$^4$ indicates another stud projecting from the plate D' and serving a purpose to be explained. D$^5$, D$^5$, are openings formed in the casing D for the passage of the chains. E indicates the time escapement device which is secured to studs F, F, extending inward from the front face of the casing D and is made up, as shown, of supporting plates E, E', secured to and spaced by studs E$^2$, E$^2$, etc. G is the main shaft of the time escapement which extends at one end through the front face of the casing and has attached to it a pointer H with an actuating handle H', the pointer being movable over a dial indicated at D$^6$, see Fig. 8. I is a coil time escapement spring secured at one end to the shaft G. J, a ratchet wheel also secured to the shaft G and operatively connecting through a pulley L' with the gear wheel L which has a bearing on the shaft G. Firmly secured to the end of the shaft G is a lever arm K having, see Fig. 3, a finger K' which operates in connection with a latching device to be described, and in Fig. 2, it engages with another latching device to be described. K$^3$ indicates another lever arm extending from the shaft G and operating in connection with the stop pin indicated at K$^4$. The time escapement mechanism, as shown in Figs. 5 and 6, is of the usual type, the gear wheel L being engaged with the pin gear M' on the shaft M, the pin gear being an extension from the hub of the gear wheel $N^2$ which is engaged with a pin wheel N' on the shaft N, the pin wheel N' being an extension from the hub of the gear wheel $N^2$. This gear in turn engages with the pin gear O on the shaft O', this pin gear being attached to the escapement wheel $O^2$ which, in turn, operates in connection with the usual double acting pulley, hair spring and balance wheel, as indicated at P.

Q is a sheave wheel having extending from its outer periphery the teeth indicated at Q' with the engaging ratchet face indicated at $Q^2$. The sheave Q is journalled on a pin $D^7$ projecting inward from the plate D' and is formed with a circular recess $D^5$ on its face. R is a cam which is secured to the end of the bearing pin $D^7$ and is made adjustable thereon. This cam, as shown, see Fig. 3, is formed with two cylindrical faces, R' and $R^3$, connected by an incline indicated at $R^2$. S, S', indicates a two arm lever pivoted on the stud $D^4$, the arm S having a turned up end indicated at $S^2$ and the arm S' a turned up end indicated at $S^3$. The latching end $S^2$ of this lever is so located that it lies in the path of the finger Q' of the sheave Q and the latching end $S^3$ of the lever arm is so located as to be engaged by a finger K' of the lever K as shown in Fig. 3. T is a lever pivoted to the face of the sheave at $Q^3$ having extending from it a finger T' which lies in contact with the surface of the cam R and a finger $T^2$ located so as to engage the finger $K^2$ of the lever K, as shown in Fig. 3. U is a cord, cable or chain secured to the groove sheave T, as indicated at U' and carrying a weight, indicated at $U^2$, on one side of the sheave, and an annular ring indicated at $U^3$ on the other side. The branch of the cable carrying the weight $U^2$ is connected to the damper B, as indicated in Fig. 1, while the other branch of the cable is connected to the damper C, as indicated at $T^5$, this branch of the cable passing over the sheaves indicated at $U^6$, $U^6$.

W, see Figs. 3 and 7, indicates a stop finger extending from the plate D' into a recess in the face of the sheave Q in which recess is also formed a stop finger $W^2$ adapted to co-act with the finger W, W' indicating a cushion device secured, as shown, to the finger W.

In operation and in normal position of rest, the parts are in the position shown best in Fig. 3, which corresponds to the position in which the damper B is closed and the damper C opened. It being desired to promote combustion in the furnace the operator pulls down on the ring $U^3$, rotating the sheave Q until its finger Q' engages and latches with the finger $S^2$ of the two arm lever SS'. In this position the damper B is open and the damper C closed as the sheave Q rotates its pivoted latch lever T, having its end $T^2$ engaged with the finger $K^2$ of the lever K rotates the shaft G of the time escapement, winding up the time escapement spring and moving the finger H over the dial $D^6$ so as to indicate just to what point the time escapement is set. During the first part of the rotation of the sheave Q, the finger T' of the pivoted latch lever T rides over the circular cam surface R' finally coming in contact with the inclined shoulder $R^2$ which lifts the latch lever T so as to disengage it from the finger $K^2$ and, after this disengagement, the cam contacting finger T' rides over the surface $R^3$ of the cam but no longer imparts any motion to the time escapement sheave. Obviously, by adjusting the cam R the time escapement can be set to operate for any desired time limit.

As soon as the time escapement is detached from the sheave Q by the action of the cam R it begins to operate and in operation carries the levers K and $K^3$ backward toward their normal point of rest and at the end of the period for which the time escapement has been set, the finger K' of the lever K comes in contact with the finger $S^3$ of the lever arm S', pushing this lever arm toward the left, as shown in Fig. 3, with the effect of raising the lever arm S and its latching finger $S^2$ so as to disengage this finger with the finger Q' of the sheave and as soon as these fingers are disengaged the weight $U^2$ is free to move downward, rotating the sheave in an anti-clockwise direction, closing the damper B and opening the damper C, the motion of the sheave being arrested by the contact of the stop fingers W, $W^2$.

The motion of the time escapement is arrested by the contact of the lever arm $K^3$ with the stop pin $K^4$ and it will be obvious that by the construction shown and described the main spring of the time escapement is wound up every time the dampers are set, so that the time escapement needs no special winding.

While I believe my invention is best embodied in the construction above described, it is capable of useful application in many modified forms. Thus, in the construction indicated in Fig. 9, I have indicated a construction in which the sheave Q provided as before with latching finger Q', operates in connection with a double armed lever ss', the arm s having a latching finger $s^2$ and the arm s' having attached to it a pivot pin $s^3$ and extending from it the finger $s^4$ pivoted on the pin $s^5$, is a rotatable arm $s^5$ having a finger $s^6$ which contacts with the arm s', as shown in Fig. 9, and a projecting finger $s^7$ normally held in the position indicated by the spring $s^8$. In this construction the time escapement shaft G has attached to its inner end the projecting finger $k$, its outer end being connected as before with the finger moving over the dial on the outside of the casing. In normal position of rest the finger $k$ occupies the position shown in dotted lines in Fig. 9. When it is desired to set the dampers for combustion, the operator, as before, pulls down on the ring $u^3$, rotating the sheave Q until its finger Q' engages the finger $s^2$. The operator must also in this modification turn the pointer and shaft G by hand to the position which determines the period of the operation of the time escapement and the time escapement in operation rotates the shaft G in an anti-clockwise direction until its finger $k$ comes in contact with the finger $s^7$, pushing the lever $s'$ to the left and lifting the finger $s^2$ out of engagement with the finger Q'. The pivotal attachment of the finger $s^7$ to the lever arm $s'$ is to enable the finger $k$ to push it out of its way when rotated from the position shown in dotted lines. In the modification shown in Fig. 10, the set of the whole apparatus is affected by the rotation of the time escapement shaft G which, of course, is readily affected by turning the handle H' attached to the pointer H. The sheave Q in this special construction has secured to its rim a ratchet indicated at $g'$ which is actuated by a ratchet pawl on the arm SS of the double armed lever, the other arm S' of which has a turned up finger SS² located in position to be engaged by an arm or finger KK secured to the shaft G. The rotation of the shaft G in a clockwise direction first permits the ratchet pulley arm SS to engage with the ratchet $g'$ and then, by contact with the finger Q' of the sheave Q, rotates the shaft and ratchet pulley by a cord or cable U which, in this construction, is connected with the dampers, as indicated in Fig. 15. The motion imparted to the dampers in this construction is proportioned to the angular motion given to the shaft G and the effect of the time escapement is to carry the finger or arm KK gradually backward until it contacts with the finger SS² when it releases the sheave finger Q' from the ratchet $g'$ with the result that the dampers are at once shifted to their normal position. In the modification shown in Figs. 11 to 14 inclusive, a double grooved sheave X having the grooves X', X², is secured to a shaft X³ which extends through the dial face of the casing and has secured to it the pointer X⁴ with attached handle X⁵. Pivotally attached to the rear side of the sheave X is the ratchet pawl X⁶ pressed inward by a spring indicated at X⁷. This pawl engages with the teeth of a ratchet $g'$ secured to the shaft $g$ which is the main shaft of the time escapement indicated at EE. This time escapement is of the usual type but in this construction has no coil driving spring.

The connections from the sheave to the dampers in this modification are made through the chains UU secured in one of the grooves as indicated at UU' and the chains $uu$ secured in the other groove as indicated at $uu'$. In the operation of this modified device the operator can either rotate the sheave by means of the handle X⁵ or by pulling down on the chains $uu$. Rotation of the sheave causes the pawl X⁶ to move over the corresponding arc of the ratchet wheel $g'$ and as soon as the apparatus is set to the desired point the weight U², acting through the chain UU turns the shaft in an anti-clockwise direction, this motion being communicated through the pawl X⁶ and ratchet $g'$ to the shaft G of the time escapement which regulates the speed of movement with which the sheave can rotate and with which the dampers connected with the sheave are correctly returned to their normal positions.

Having now described my invention, what I claim as new and desire to secure by Letters Patent, is:

1. Mechanism for shifting the dampers of a furnace which regulate the draft of air through the fuel bed comprising a sheave to which connection to the dampers can be secured, a time escapement having a main shaft and driving spring, a latch mechanism engaged when the sheave is in normal position of rest whereby the rotation of the sheave rotates the main shaft and winds the spring of the time escapement, a cam for disconnecting the latch mechanism when the sheave has moved through a determined arc, a latch for holding the sheave in fixed position after it has moved through a determined arc and a latch releasing finger actuated by the time escapement whereby the sheave is released after a determined time.

2. Mechanism for shifting the dampers of a furnace which regulate the draft of air through the fuel bed comprising a sheave to which connection to the dampers can be secured, a time escapement having a main shaft and driving spring, a latch mechanism engaged when the sheave is in normal position of rest whereby the rotation of the sheave rotates the main shaft and winds the spring of the time escapement, an adjustable cam for disconnecting the latch mechanism when the sheave has moved through a determined arc, a latch for holding the sheave in fixed position after it has moved through a determined arc, and a latch releasing finger actuated by the time escapement whereby the sheave is released after a determined time.

3. Mechanism for shifting the dampers of a furnace which regulate the draft of air through the fuel bed comprising a sheave to which connection to the dampers can be secured, a time escapement having a main shaft and driving spring, a dial and a pointer connected to the time escapement, a latch mechanism engaged when the sheave is in normal position of rest whereby the rotation of the sheave rotates the main shaft and winds the spring of the time escapement, a cam for disconnecting the latch mechanism when the sheave has moved through a determined arc, a latch for holding the sheave in fixed position after it has moved through a determined arc and a latch releasing finger actuated by the time escapement whereby the sheave is released after a determined time.

BERT McCLELLAND.